United States Patent
Swaans et al.

(10) Patent No.: US 9,847,651 B2
(45) Date of Patent: Dec. 19, 2017

(54) POWER TRANSMITTER DEVICE FOR INDUCTIVELY PROVIDING POWER TO A MOBILE DEVICE

(71) Applicant: KONINKLIJKE PHILIPS N.V., Eindhoven (NL)

(72) Inventors: Laurens Henricus Swaans, Eindhoven (NL); Antonius Adriaan Maria Staring, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 687 days.

(21) Appl. No.: 14/360,032

(22) PCT Filed: Nov. 7, 2012

(86) PCT No.: PCT/IB2012/056215
§ 371 (c)(1),
(2) Date: May 22, 2014

(87) PCT Pub. No.: WO2013/080068
PCT Pub. Date: Jun. 6, 2013

(65) Prior Publication Data
US 2015/0022019 A1    Jan. 22, 2015

Related U.S. Application Data

(60) Provisional application No. 61/564,881, filed on Nov. 30, 2011.

(51) Int. Cl.
*H02J 7/02* (2016.01)
*H02J 7/00* (2006.01)
(Continued)

(52) U.S. Cl.
CPC ............ *H02J 5/005* (2013.01); *H02J 7/0027* (2013.01); *H02J 7/0044* (2013.01); *H02J 7/025* (2013.01);
(Continued)

(58) Field of Classification Search
CPC .... H02J 5/005; H02J 7/025; H02J 5/10; H02J 7/0027; H02J 7/0044
See application file for complete search history.

(56) References Cited

U.S. PATENT DOCUMENTS 5,070,293 A    12/1991  Ishii
7,750,508 B2 *  7/2010  Kato .................... H02J 7/0044
                                                              307/104
(Continued)

FOREIGN PATENT DOCUMENTS

CN          101409370 A      4/2009
JP          2007166763 A     6/2007
(Continued)

*Primary Examiner* — Ryan Johnson
(74) *Attorney, Agent, or Firm* — Larry Liberchuk

(57) ABSTRACT

An inductive power transmitter device provides power to a mobile device with a receiver coil. The transmitter device comprises a holder and a coil arrangement. The holder has a cavity defined by two walls, where the cavity is configured for receiving the mobile device between those surfaces. The coil arrangement has two transmitter coil units, where one of the coil units is arranged into one of the walls and the other transmitter coil unit is arranged into the other wall. Each of the coil units is configured for inductively coupling to the receiver coil of the mobile device when inserted into the cavity of the holder.

4 Claims, 3 Drawing Sheets

(51) Int. Cl.
  *H02J 5/00*    (2016.01)
  *H04B 5/00*    (2006.01)
  *H02J 50/10*   (2016.01)
  *H02J 50/90*   (2016.01)

(52) U.S. Cl.
  CPC ............ *H02J 50/10* (2016.02); *H04B 5/0037* (2013.01); *H04B 5/0075* (2013.01); *H04B 5/0087* (2013.01); *H02J 50/90* (2016.02)

(56) References Cited

U.S. PATENT DOCUMENTS

| | | | |
|---|---|---|---|
| 7,868,585 B2 | 1/2011 | Sarnowsky | |
| 7,878,585 B2 | 2/2011 | Salisbury | |
| 7,940,024 B2* | 5/2011 | Zhang | H02J 7/0044 320/108 |
| 8,723,642 B2* | 5/2014 | Park | G07F 15/006 320/103 |
| 2005/0156560 A1* | 7/2005 | Shimaoka | H02J 7/0027 320/107 |
| 2007/0210889 A1 | 9/2007 | Baarman | |
| 2009/0021219 A1* | 1/2009 | Yoda | H02J 7/025 320/137 |
| 2009/0096413 A1 | 4/2009 | Partovi | |
| 2010/0201312 A1* | 8/2010 | Kirby | H02J 7/0042 320/108 |
| 2011/0065383 A1 | 3/2011 | Frankland | |
| 2011/0241608 A1 | 10/2011 | Adamczyk | |
| 2011/0241615 A1* | 10/2011 | Yeh | H02J 7/0027 320/108 |
| 2012/0062179 A1 | 3/2012 | Kuo | |

FOREIGN PATENT DOCUMENTS

| | | |
|---|---|---|
| JP | 2010171091 A | 8/2010 |
| JP | 2011097535 A | 5/2011 |
| JP | 2011229314 A | 11/2011 |
| RU | 2010107143 A | 9/2011 |
| WO | WO2008038203 A2 | 4/2008 |
| WO | WO2010093719 A1 | 8/2010 |

* cited by examiner

POWER TRANSMITTER DEVICE FOR INDUCTIVELY PROVIDING POWER TO A MOBILE DEVICE

FIELD OF THE INVENTION

The invention relates to an inductive power transmitter device for inductively providing power to a mobile device provided with a receiver coil unit.

In everyday speech a mobile device is a small, hand-held computing device, typically having a display screen, such as mobile phones, smart phones and PDAs. In the present document the term "mobile device" is not restricted to the foregoing definition, but also includes other relatively small portable or hand-held devices, such as digital cameras, MP3 players and battery units.

BACKGROUND OF THE INVENTION

Mobile electronic devices are increasingly used in both business and personal environments for e.g. communication and entertainment. Examples of such devices are mobile phones, smart phones and music players. Such mobile devices are provided with a battery for storing energy. If these mobile devices are also provided with a coil, particularly a secondary coil, the battery can be charged or recharged by means of an inductive battery charger. A prior art charger comprises a base station having a horizontally oriented flat supporting surface for supporting the mobile device to be charged or recharged. A primary coil or a primary coil array is accommodated in the base station, as well as the necessary electronics for energizing the primary coil or coil array. Wireless power transfer is enabled by positioning the mobile device on the supporting surface, in such a way that the secondary coil of the mobile device faces the supporting surface of the base station, wherein the supporting constitutes a charging area.

A drawback of the known charger is that wireless charging can not occur when the mobile device is positioned upside down on the supporting surface of the base station, because in that situation the secondary coil of the mobile device is at a too large distance to the primary coil or coil array of the base station for making an inductive coupling.

SUMMARY OF THE INVENTION

It is an object of the invention to provide an inductive power transmitter device for providing power to a mobile device, which allows a user to connect the mobile device to the transmitter device without being worried about the right position of the mobile device.

This object is achieved by the inductive power transmitter device as described in claim 1. More particularly, the inductive power transmitter device according to the invention comprises a holder having a cavity defined by two walls providing facing surfaces, which cavity is configured for receiving the mobile device between these facing surfaces, and a coil arrangement having two transmitter coil units, also called primary coil units, wherein one of these coil units is arranged into one of said walls and the other of these transmitter coil units is arranged into the other of said walls, and wherein each of the transmitter coil units is configured for inductively coupling to the receiver coil unit, also called secondary coil unit, of the mobile device, when the mobile device is brought into said cavity. The holder may be a housing, a frame, a chassis and the like. The facing surfaces may be defined as interface surfaces or charging areas. The mobile device may be in principle all kind of electronic portable devices, such as mobile phones, digital cameras, MP-3 players, as well as batteries and battery packs. As a rule, the receiver coil unit is positioned near a main side, usually the upper side or the lower side, of the mobile device. The receiver coil unit may have one or more receiver coils of any suitable shape.

In order to charge or recharge the mobile device, the mobile device is inserted into the cavity of the transmitter device according to the invention, i.e. the mobile device is put between said two walls, whereby the receiver coil unit of the mobile device always faces one of the surfaces of the transmitter device. In this way the receiver coil unit of the mobile device inserted into the cavity is always in the right position for inductively coupling with one of the charging areas of the transmitter device.

In a practical embodiment of the inductive power transmitter device according to the invention the transmitter coil units are planar coil units. Preferably, the transmitter coil units are oriented parallel or substantially parallel to the interface surfaces. Each transmitter coil unit may be a single flat coil or a flat array of coils. The coil or the array of coils may have a fixed or variable position inside the walls. The coil or array of coils may be a coil and a coil array, respectively, known per se. Usually, the primary coils are flat round coils, however flat coils of any other suitable shape may also be applied.

In a practical embodiment of the inductive power transmitter device according to the invention the cavity is a slot-like cavity. Generally speaking, the mobile devices are thin box-like devices having two main sides, mostly constituted by an upper side and a lower side. For this reason a slot-like cavity is a convenient cavity for receiving this kind of devices. In the inserted state of the mobile device the main sides face the charging areas of the transmitter device.

A preferred embodiment of the inductive power transmitter device according to the invention is provided with an adjusting mechanism for adjusting the distance between the facing surfaces by moving at least one of the surfaces with respect to the other. In this embodiment the distance between the facing surfaces can be adapted to the variety of dimensions of mobile devices. An embodiment of the adjusting mechanism comprises one or more resilient or elastic components which are accommodated into at least one of the facing walls and which allow movements of the surface of the at least one wall in a direction perpendicular to said surface in order to increase or decrease the distance between the facing surfaces. The adjustment may take place automatically when the mobile device is pushed into the transmitter device. Another embodiment of the adjusting mechanism comprises a means for moving at least one of the facing walls to and from the other wall. This means may comprise an electric actuator and the like for displacing one or both walls. Alternatively, said means may be a hand-operated means e.g. being a slide mechanism whether or not provided with a locking mechanism.

A preferred embodiment of the inductive power transmitter device according to the invention is provided with a securing mechanism for securing the mobile device, when the mobile device is inserted into the cavity, between the facing surfaces. This embodiment provides a convenient means for retaining the mobile device in its charging position even when the transmitter device is subjected to displacements. Displacements may occur accidentally, but may also depend on the application. The transmitter device may be constituted as a stationary device, such as a stand-alone device, or may be an integral part of an apparatus. In a favorable application the transmitter device is integrated into a vehicle, e.g. into the dashboard or the middle console of a car. A moving car always causes accelerations and decelerations, as well as mechanical vibrations. The transmitter device integrated into the car is also subject to these accelerations, decelerations and mechanical vibrations. The securing mechanism prevents a disturbance of the position of the mobile device inserted into the transmitter device due to said accelerations, decelerations and mechanical vibrations and an interruption of the energy transmission. The transmitter device may also be built-in into a ship or an airplane. The securing mechanism can be an integral part of the adjusting mechanism, wherein components of the adjusting mechanism may have or also may have a securing function. In a relatively simple embodiment of the securing mechanism at least one of the facing surfaces has a certain skid-resistance, such that there is sufficient friction to prevent unwanted movements of the mobile device when the mobile device is inserted into the transmitter device, i.e. when it is in the position for making inductive contact.

A preferred embodiment of the inductive power transmitter device according to the invention is provided with a clamping mechanism for clamping the mobile device, when inserted into the cavity, between the facing surfaces. De facto the clamping mechanism is an embodiment of the above-mentioned securing mechanism and may also be an integral part of the adjusting mechanism.

A preferred embodiment of the inductive power transmitter device according to the invention is characterized in that the coil arrangement has at least one power source for supplying the transmitter coil units with electric power. This is a practical and advantageous alternative for using an external power source. It may simplify the required electronics. The at least one power source may be a power source known per se.

In a preferred embodiment of the inductive power transmitter device according to the invention the at least one power source is a common power source for supplying electric power to both transmitter coil units. In this simplified embodiment both transmitter coil units share one power source, i.e. the common power source.

In a preferred embodiment of the inductive power transmitter device according to the invention the coil arrangement has electronics for detecting the location of the receiver coil unit of the mobile device when inserted into the cavity. Based on the detection result, an output signal of said electronics is generated, and thus one of the transmitter coil unit which is closest to the receiver coil unit is activated, wherein the activated coil unit faces the receiver coil unit. For the sake of completeness it is noted that the activated coil unit is the coil unit which is closest to the receiver coil unit. Detection methods, e.g. using resonance or detection signals, are known per se.

A preferred embodiment of the inductive power transmitter device according to the invention is configured for cooperation with the mobile device now provided with two receiver coil units, wherein one of these receiver coil units is provided near a main side of the mobile device and the other of these receiver coil units is provided near a further main side of the mobile device, both main sides being turned away from each other, wherein the coil arrangement has at least one power source for simultaneously supplying electric power to both transmitter coil units. This embodiment enables an efficient energy transfer to the mobile device described above.

The invention also refers to an inductive power transmitter system comprising the inductive power transmitter device according to the invention and comprising a mobile device configured for cooperation with this inductive power transmitter device. The defined inductive power transmitter system according to the invention has advantages similar to the advantages of the inductive power transmitter device according to the invention.

It is to be noted that U.S. Pat. No. 7,878,585 B2 discloses a wireless charging device for providing power to a cell phone provided with a secondary coil. This charging device comprises a base housing configured to fit within a cup holder in a vehicle, and further comprises a top housing having a top surface and a rest surface both configured to allow the cell phone to be placed on the top surface. The disclosed charging device further comprises a primary charging unit including a charging circuit and a primary coil for inductively providing power.

It is further to be noted that U.S. Pat. No. 5,070,293 discloses an electric power transmitting device for charging a bar-code reader. This transmitting device comprises a first rectangular coil having a bent portion extending along the axial direction of this coil. The reader comprises a second flat rectangular coil which is inserted into the first coil through said bent portion when the reader is brought into its charging position. In the charging position the first and second coils are disposed in substantially one plane for making an inductive coupling between both coils.

Both prior art charging devices are substantially different from the inductive power transmitter device according to the invention.

Furthermore it is to be noted that US 2011/0241608 A1 discloses an inductive battery charger comprising an inductive charging cup module having a charging cup capable of receiving a battery. A primary inductive coil is embedded in the charging cup module beneath the charging cup. The primary inductive coil inductively transfer power to the battery received by the charging cup.

None of these known devices is provided with a coil arrangement having two transmitter coil units and a holder having a cavity defined by two walls providing facing interface surfaces, wherein the cavity is configured for receiving the mobile device between these interface surfaces, and wherein one of these coil units is arranged into one of said walls and the other of these transmitter coil units is arranged into the other of said walls, and wherein each of the coil units is configured for inductively coupling to a receiver coil unit of the mobile device when inserted into said cavity of the holder, i.e. when the mobile device is in its charging position.

The invention further refers to a mobile device, particularly a mobile device configured for cooperation with the inductive power transmitter device according to the invention. The mobile device according to the invention is characterized in that the mobile device is provided with two receiver coil units, also called secondary coil units, wherein one of these receiver coil units is provided near a main side of the mobile device and the other of these receiver coil units is provided near a further main side of the mobile device, both main sides being turned away from each other. The defined mobile device according to the invention is very suitable for cooperation with the inductive power transmitter device according to the invention. The secondary coils of the receiver coil units may be flat round coils, however coils of any other suitable shape may also be applied.

An embodiment of the mobile device according to the invention is provided with at least one further receiver coil unit, provided near at least one other side, i.e. provided on one or more sides different from the above-mentioned main sides. This embodiment is very suitable for cooperation with certain embodiments of the inductive power transmitter device according to the invention.

With reference to the attached claims it is noted that all possible combinations of features mentioned in the claims are part of the invention.

BRIEF DESCRIPTION OF THE DRAWINGS

A detailed description of the invention is provided below. The description is provided by way of non-limiting examples to be read with reference to the drawings in which.

DETAILED DESCRIPTION OF THE EMBODIMENTS

Figure 1:
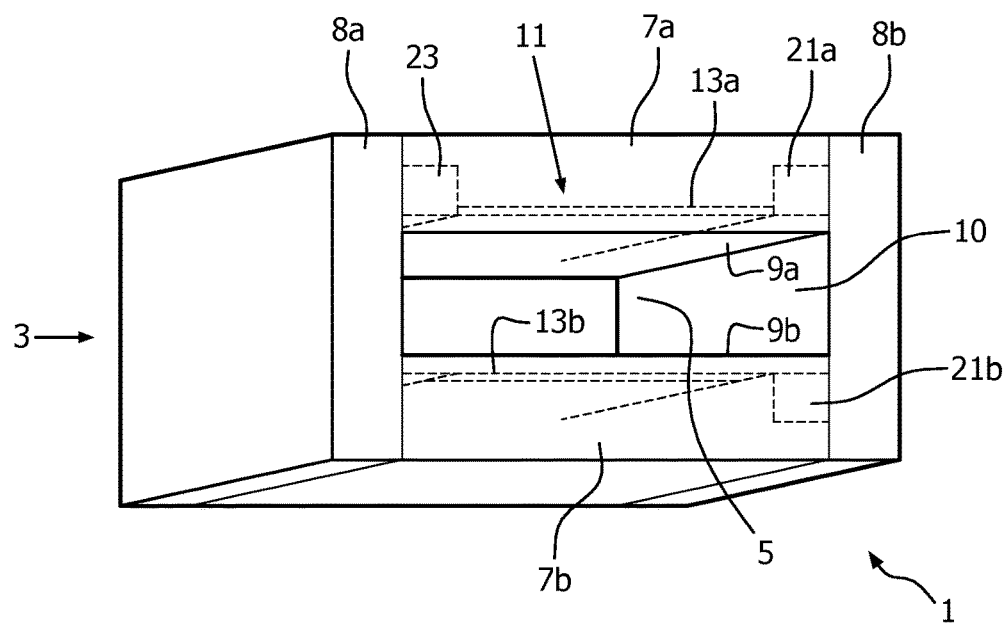
FIG. 1 schematically shows a first embodiment of the inductive power transmitter device according to the invention.

It is expressly noted that the disclosed embodiments are schematically depicted. The embodiments represent examples of the devices according to the invention. The same reference numerals have been used in the several embodiments for the same or corresponding elements and parts, however not all the elements and parts have been indicated in the several embodiments.

Figure 5:
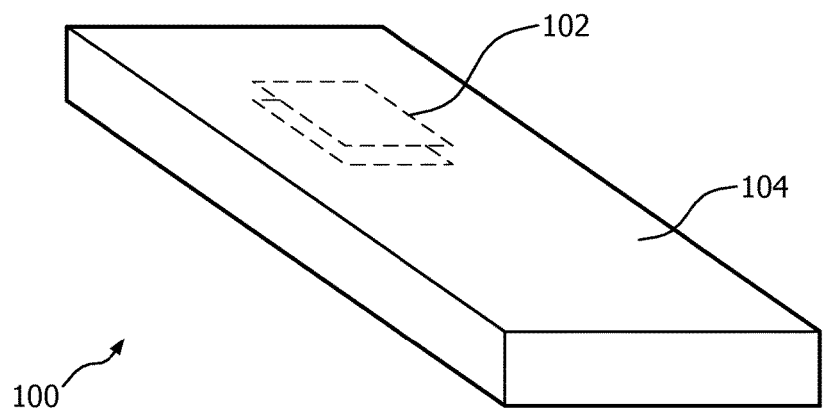
FIG. 5 schematically shows an embodiment of a mobile device.

The inductive power transmitter device 1 shown in FIG. 1 is configured for inductively providing power to a mobile device provided with a receiver coil unit. An embodiment 100 of such a mobile device is depicted in FIG. 5, wherein the receiver coil unit is indicated by the numeral 102. The transmitter device 1 comprises a holder 3 and a coil arrangement 11. The holder 3, which may be made of any suitable material, e.g. plastics, has two walls 7a,7b and a cavity 5 defined by the walls 7a,7b, wherein the walls 7a,7b provide facing interface surfaces 9a,9b. In this embodiment the holder 3 further has two supports 8a,8b and an insert opening 10. The cavity 5 is configured for receiving the mobile device between the surfaces 9a,9b. In this embodiment the cavity 5 is a slot-like cavity. The coil arrangement 11 is provided with two transmitter coil units 13a,13b. A coil unit 13a is integrated into a wall 7a, near to and oriented parallel to the surface 9a, and a transmitter coil unit 13b is integrated into a wall 7b, near to and parallel to the surface 9b. The coil units 13a,13b are substantially flat units and are each provided with one or more flat or planar coils or coil arrays, also called primary coils and primary coil arrays, respectively. Such a coil or coil array may be a known coil and coil array, respectively, and may be e.g. circular, rectangular or quadrangular of shape. Other suitable flat shapes are also possible. Each of the coil units 13a,13b is configured for inductively coupling to the receiver coil unit of the mobile device when the mobile device is inserted into the cavity 5 of the holder 3. This means that irrespective the orientation of the inserted mobile device, i.e. whether or not upside down, there is always one of the surfaces 9a,9b which is able to make an inductive contact with the receiver coil unit of the mobile device. In the present embodiment the coil arrangement 11 has two power sources 21a, 21b for supplying electric power to the transmitter coil units 13a,13b, wherein the source 21a is electrically coupled to the coil unit 13a and the source 21b is electrically coupled to the coil unit 13b. The power sources 21a,21b may be known power sources. In the present embodiment the coil arrangement 11 further has electronics 23 for detecting the location of the receiver coil unit of the mobile device when the mobile device is inserted into the cavity 5. The electronics 23 may be a known electronic means.

Figure 2:
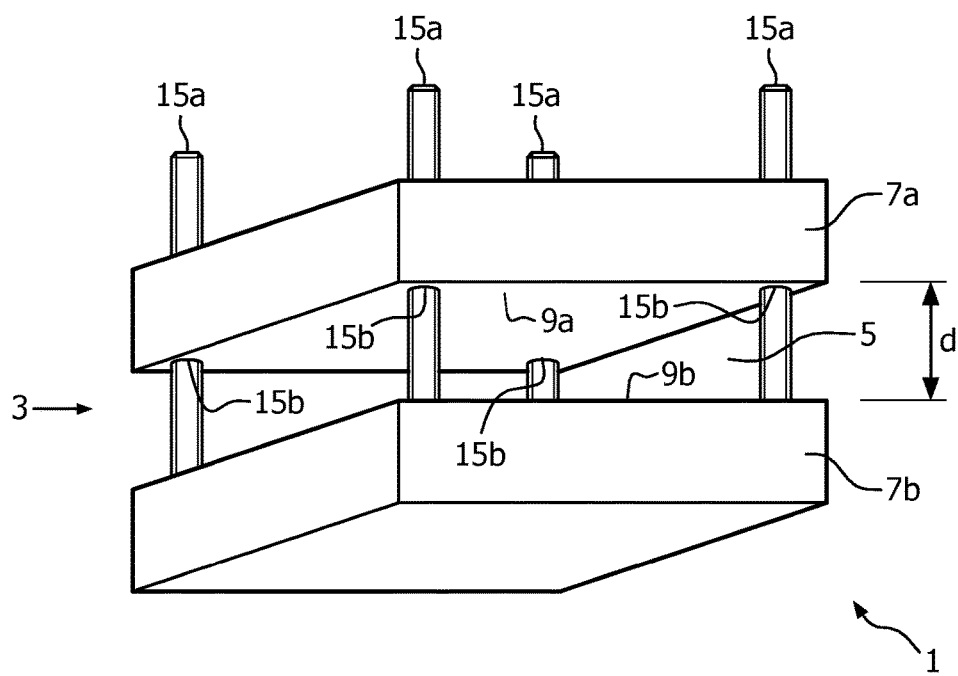
FIG. 2 schematically shows a second embodiment of the inductive power transmitter device according to the invention.

The inductive power transmitter device 1 shown in FIG. 2 is provided with an adjusting mechanism 15 for adjusting the distance (d) between the facing surfaces 9a,9b. In this embodiment the adjusting mechanism comprises spindles 15a provided with outer screw thread and rotatably mounted on the wall 7b of the holder 3. The spindles 15a insert through openings 15b provided with inner screw thread and provided into the wall 7a. By rotating the spindles 15 the distance d between the interface surfaces 9a,9b can be adjusted in order to adapt the cavity 5 to the seize of a mobile device. A rotation of the spindles may be caused by hand, but alternatively an electric drive may be used. The adjusting mechanism 15 can also be used for securing an inserted mobile device into the holder 3. This may be realized in the present embodiment by rotating the spindles 15a after inserting the mobile device, in a way that the walls 7a,7b move to each other in order to clamp the inserted mobile device between the two surfaces 9a,9b.

Figure 3:
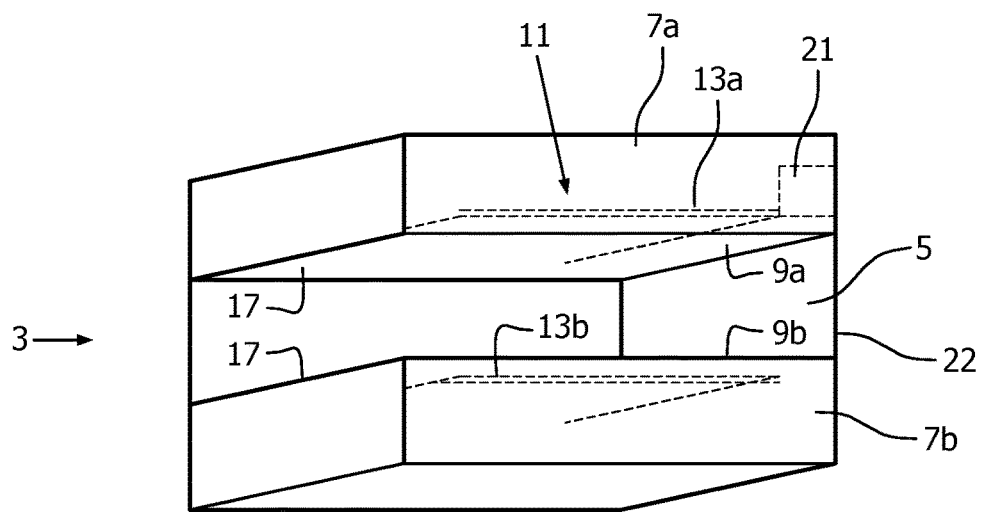
FIG. 3 schematically shows a third embodiment of the inductive power transmitter device according to the invention.

The inductive power transmitter device 1 shown in FIG. 3 is provided with a securing mechanism 17 for securing a mobile device, when the mobile device is inserted into the cavity 5, between the facing surfaces 9a,9b. In this embodiment the securing mechanism 17 is constituted by a material with a relatively high surface friction coefficient. This material is provided on or is part of one or both interface surfaces 9a,9b. The friction coefficient should have such a value that the inserted mobile device is retained between the walls 7a,7b under use conditions, without substantially hindering the ease of use, particularly the put-in movement and the draw-out movement of the mobile device. In this embodiment only one electric power source, i.e. a common power source 21, is provided for supplying electric power to both transmitter coil units 13a,13b. The common power source 21 is located in the wall 7a and is inside the wall 7a coupled to the coil unit 13a and is coupled to the coil unit 13b in the wall 7b via an electrical power connector 22. Other embodiments, e.g. the transmitter device 1 depicted in FIG. 1, can also be provided with a common power source 21 in stead of two separate power sources 21a,21b. The power source 21 may be a known power source.

Figure 4:
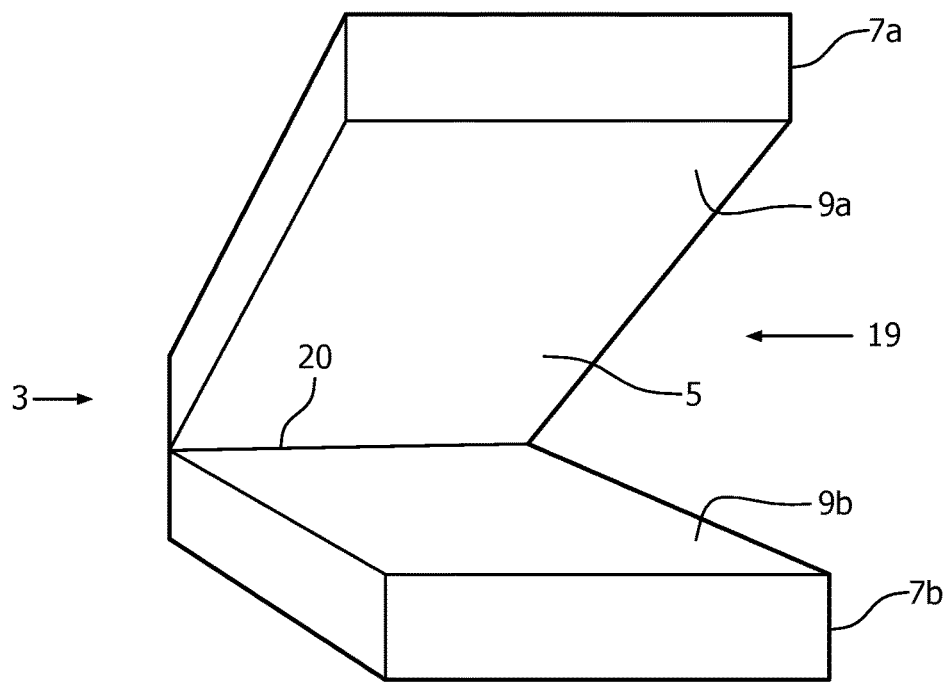
FIG. 4 schematically shows a fourth embodiment of the inductive power transmitter device according to the invention.

The inductive power transmitter device 1 shown in FIG. 4 is provided with a clamping mechanism 19 for clamping a mobile device, when the mobile device is inserted into the cavity 5, between the facing surfaces 9a,9b. In this embodiment the clamping mechanism 19 is constituted by a flexible material, e.g. a foam rubber, being part of one or both walls 7a,7b of the holder 3. The flexible material is able to adapt its shape to the contours of the inserted mobile device. In the present embodiment the walls 7a,7b are pivotable with regard to each other by means of a pivot hinge 20. However other constructions are possible, e.g. the walls 7a,7b may be able to perform rectilinear movements with regard to each other, as disclosed in e.g. FIG. 2.

The mobile device 100 shown in FIG. 5 is configured for cooperation with the inductive power transmitter device according to the invention, of which embodiments are depicted in the FIGS. 1 to 4, particularly the transmitter device 1. The mobile device 100, which may be a mobile phone or another portable electronic device, has a receiver coil unit 102 provided near a main side 104, usually the bottom side, of the mobile device 100. Such a mobile device may be known per se. When the mobile device 100 is inserted into the cavity 5 of the transmitter device 1, see e.g. FIG. 1, the main side 104 always faces one of the interface surfaces 9a,9b of the holder 3. In other words the inserted mobile device is always in the right position to be charged.

Figure 6:
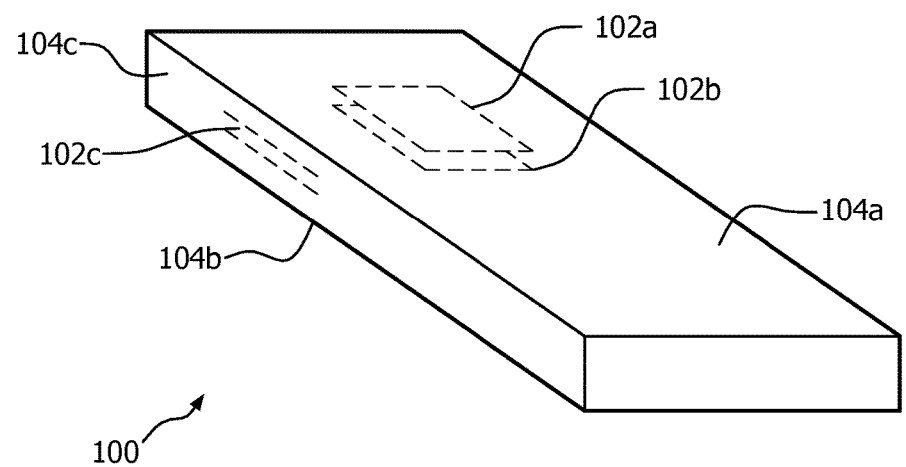
FIG. 6 schematically shows an embodiment of the mobile device according to the invention.

The mobile device 100 shown in FIG. 6 is provided with two planar receiver coil units 102a,102b, also called secondary coil units, each having one or more secondary coils. One coil unit 102a is provided near and parallel to main side 104a of the mobile device and the other coil unit 102b is provided near and parallel to a further main side 104b of the mobile device. Both main sides are turned away from each other and may be the upper side and the lower side, respectively, of the mobile device 100. Embodiments of the inductive power transmitter device according to the invention are configured for cooperation with the mobile device 100 as depicted in FIG. 6. In such an embodiment the coil arrangement has a common power source or two separate power sources configured for simultaneously supplying electric power to both transmitter coil units. In the inserted position of the mobile device 100 one main side 104a faces one of the interface surfaces of the transmitter device and the other main side 104b faces the other interface surface. The transmitter device and the mobile device 100 constitute an efficient inductive power transmitter system.

In an alternative embodiment of the mobile device 100 as depicted in FIG. 6 at least one further receiver coil unit 102c, provided near and parallel to at least one other side 104c, e.g. one of the flanks of the mobile device.

Summarizing it can be stated that a main aspect of the invention relates to an inductive power transmitter device for inductively providing power to a mobile device provided with a receiver coil unit. The transmitter device comprises a holder and a coil arrangement. The holder has a cavity extending between two walls providing facing surfaces, wherein the cavity is configured for receiving the mobile device between these facing surfaces. The coil arrangement has two transmitter coil units, wherein one of these coil units is arranged into one of said walls and the other of these transmitter coil units is arranged into the other of said walls, and wherein each of the coil units is configured for inductively coupling to the receiver coil unit of the mobile device when inserted into the cavity of the holder. These features allow a user to connect the mobile device to the transmitter device without paying seriously attention to the right position of the mobile device. Another aspect of the invention relates to an inductive power transmitter system comprising the inductive power transmitter device according to the invention and comprising a mobile device configured for cooperation with the transmitter device. A further aspect of the invention relates to a mobile device configured for cooperation with the transmitter device.

It will be clear to a person skilled in the art that the scope of the present invention is not limited to the examples discussed in the foregoing. Several amendments and modifications of the discussed examples are possible without deviating from the scope of the present invention as defined in the claims. While the present invention has been illustrated and described in detail in the figures and the description, such illustration and description are to be considered illustrative or exemplary only, and not restrictive. The present invention is not limited to the disclosed embodiments. Any variation to and combination of the described and/or depicted embodiments which can be understood and effected by a person skilled in the art in practicing the claimed invention, from a study of the figures, the description and the attached claims, is part of the invention. The power transmitter device according to the invention may be used as a charger, but is not restricted to this use. In the claims, the word "comprise" and conjugations thereof do not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

The invention claimed is:

1. An inductive power transmitter device for inductively providing power to a mobile device, comprising:
   a holder having a cavity defined by two walls with facing surfaces, the cavity being configured for receiving the mobile device between the facing surfaces; and
   a coil arrangement having two transmitter coil units, wherein one of the coil units is arranged into one of the walls and the other of the transmitter coil units is arranged into the other of the walls, and wherein each of the coil units is configured for inductively coupling to the receiver coil unit of the mobile device when inserted into the cavity of the holder, wherein an adjusting mechanism is provided for adjusting the distance between the facing surfaces by moving at least one of the surfaces with respect to the other in order to accommodate mobile devices of different sizes.

2. An inductive power transmitter system, comprising:
   a mobile device provided with two receiver coil units, wherein one of the receiver coil units is provided near a main side of the mobile device and the other of the receiver coil units is provided near a further main side of the mobile device, both main sides being turned away from each other, the mobile device further comprising at least one further receiver coil unit, provided near at least one other side; and
   an inductive power transmitter device for inductively providing power to the mobile device, the inductive power transmitter comprising a holder having a cavity defined by two walls with facing surfaces, the cavity being configured for receiving the mobile device between the facing surfaces, and a coil arrangement having two transmitter coil units, wherein one of the coil units is arranged into one of the walls and the other of the transmitter coil units is arranged into the other of the walls, and wherein each of the coil units is configured for inductively coupling to the receiver coil unit of the mobile device when inserted into the cavity of the holder.

3. An inductive power transmitter device for inductively providing power to a mobile device, comprising:
   a holder having a cavity defined by two walls with facing surfaces, the cavity being configured for receiving the mobile device between the facing surfaces;
   a coil arrangement having two transmitter coil units, wherein one of the coil units is arranged into one of the walls and the other of the transmitter coil units is arranged into the other of the walls, and wherein each of the coil units is configured for inductively coupling to the receiver coil unit of the mobile device when inserted into the cavity of the holder; and a clamping mechanism for clamping the mobile device, when inserted into the cavity, between the two walls with the facing surfaces.

4. An inductive power transmitter system, comprising:

a mobile device;

an inductive power transmitter device for inductively providing power to the mobile device, the inductive power transmitter comprising a holder having a cavity defined by two walls with facing surfaces, the cavity being configured for receiving the mobile device between the facing surfaces, and a coil arrangement having two transmitter coil units, wherein one of the coil units is arranged into one of the walls and the other of the transmitter coil units is arranged into the other of the walls, and wherein each of the coil units is configured for inductively coupling to the receiver coil unit of the mobile device when inserted into the cavity of the holder; and a clamping mechanism for clamping the mobile device, when inserted into the cavity, between the two walls with the facing surfaces.

* * * * *